United States Patent

[11] 3,599,807

| [72] | Inventors | Robert R. Hedrick<br>Brookfield;<br>Robert W. Wischer, Delafield, both of, Wis. |
|---|---|---|
| [21] | Appl. No. | 7,642 |
| [22] | Filed | Feb. 2, 1970 |
| [45] | Patented | Aug. 17, 1971 |
| [73] | Assignee | Cutler-Hammer, Inc.<br>Milwaukee, Wis. |

[54] ARTICLE COUNTER-STACKER HAVING MECHANICALLY OPERATED GATES ON THE STACK-RECEIVING TABLE
4 Claims, 7 Drawing Figs.

[52] U.S. Cl. .................................. 214/6.5,
 214/6 DK, 271/86
[51] Int. Cl. ........................................... B65g 57/06
[50] Field of Search ............................ 214/6 H, 6
 K, 6 P, 6 M, 6.5; 271/88, 86

[56] References Cited
UNITED STATES PATENTS

| 2,333,479 | 11/1943 | Graf | 214/6 DK |
|---|---|---|---|
| 3,154,307 | 10/1964 | Williamson | 214/6 DK X |
| 3,532,230 | 10/1970 | Gutberlet et al. | 214/6 DK |

*Primary Examiner*—Gerald M. Forlenza
*Assistant Examiner*—Robert J. Spar
*Attorney*—Hugh R. Rather

ABSTRACT: A plurality of aligned pairs of stacking blades are indexed downward past the output end of a lapped stream newspaper conveyor. The blades are pivotally mounted to respective sets of link chains and spring biased to a normal position. A latch member interferes with a pair of blades just above the input conveyor to restrain those blades against the spring bias and releases them coincident with the beginning of an indexing cycle to cleanly intercept the stream and index those blades to a stacking position. A subsequent indexing cycle moves those blades apart to drop the stack to a table which may be indexed in one-half revolution intervals to permit a second stack to be dropped upon the first, forming a double batch stack with the folded edges on opposite sides. The table has high side walls and mechanically operated gates closing off the ends between the sidewalls to restrain the stack on the table during indexing. A gate actuating mechanism on the frame of the machine is spring biased to normally engage the gate linkage to cause the gates to be opened, but the mechanism is held retracted at all times except during the operation of a pusher mechanism which travels over the table to eject the stack.

ARTICLE COUNTER-STACKER HAVING MECHANICALLY OPERATED GATES ON THE STACK-RECEIVING TABLE

CROSS-REFERENCE TO RELATED APPLICATION

This application represents improvements to an article counting and stacking machine of the type disclosed in a copending application Ser. No. 720,774 filed Apr. 12, 1968 now U.S. Pat. No. 3,532,230 and assigned to the assignee herein.

BACKGROUND OF THE INVENTION

This invention relates to machines for counting and stacking flexible articles and more particularly to such machines for counting newspapers or like articles as they are fed into the machine from a press conveyor and for stacking the newspapers in stacks of one or more batches of predetermined numbers.

Newspapers have a wedge shape due to the folded edge and stacks containing large numbers of papers are therefore very unstable. To compensate for this instability, large stacks are formed of two separate batches, one of which has the folded edges displaced 180° with respect to the other. This is accomplished by rotating a stack receiving table of the machine through one-half revolution between batch deliveries to the receiving table.

Modern printing presses operate at very high speeds which in turn require that associated machinery also perform at high speeds. New counting and stacking machines have shorter cycle times which increase the operating speeds of all moving components therein including the rotation of a stack receiving table. As a result, it has become necessary to place some means of restraint on an unstable batch of newspapers while it is rapidly indexed through a half revolution to keep the batch from being upset.

SUMMARY OF THE INVENTION

It is therefore a primary object of this invention to provide a high speed counting and stacking machine for flexible articles which can rapidly receive and stack predetermined numbers of articles into stacks of more than one batch, the two batches having the folded edges thereof displaced by 180°.

It is a further object of this invention to provide a rotatable table in a machine of the above type which has means automatically operable to restrain the batch of papers thereon during an indexing period thereof.

These and other objects and advantages of this invention will become more apparent in the following specification and claims when read in conjunction with the accompanying drawings.

DESCRIPTION OF THE PREFERRED EMBODIMENT

Figure 1:
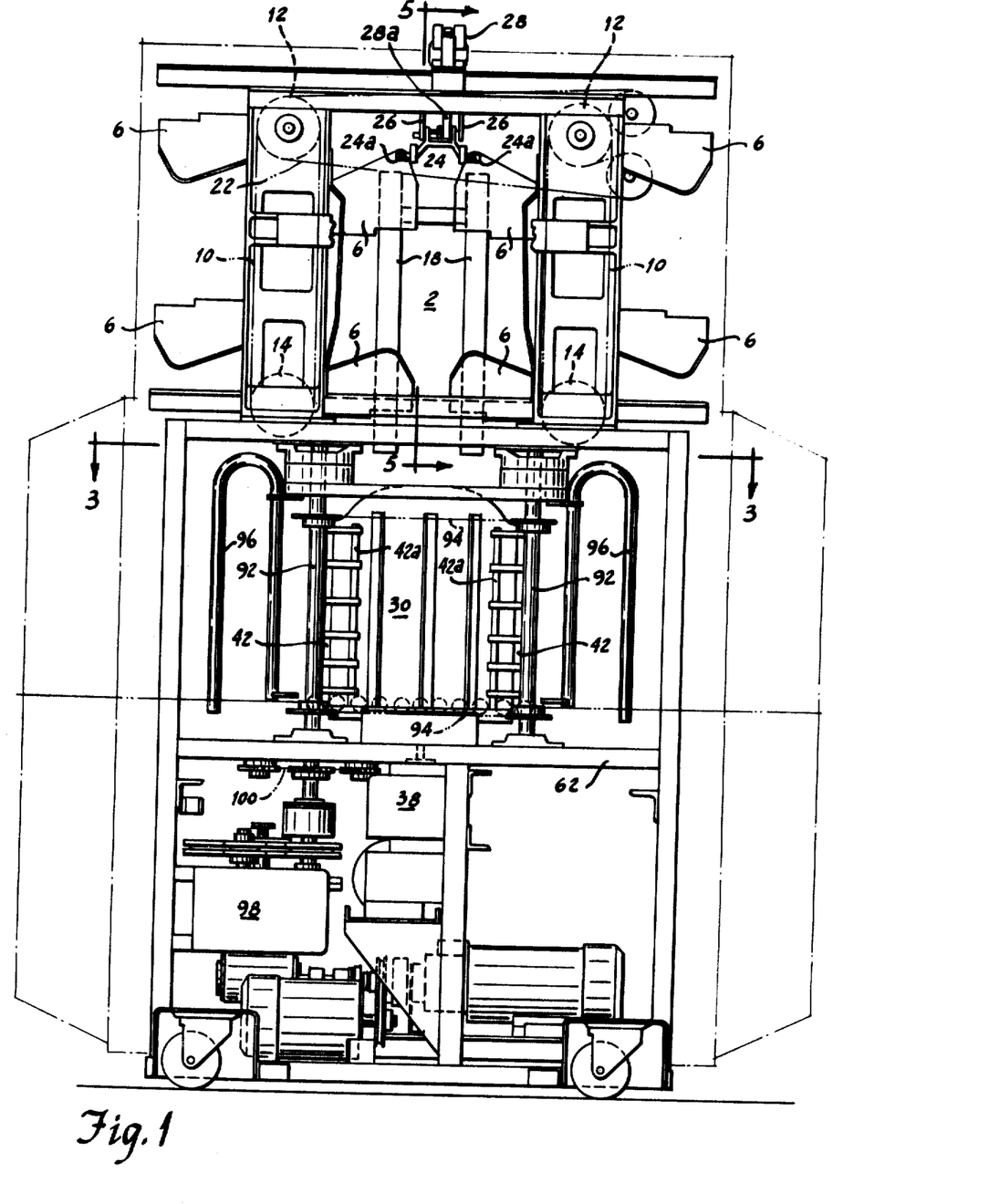
FIG. 1 is an elevational view of the input side of the counter stacker machine of this invention.
Figure 2:
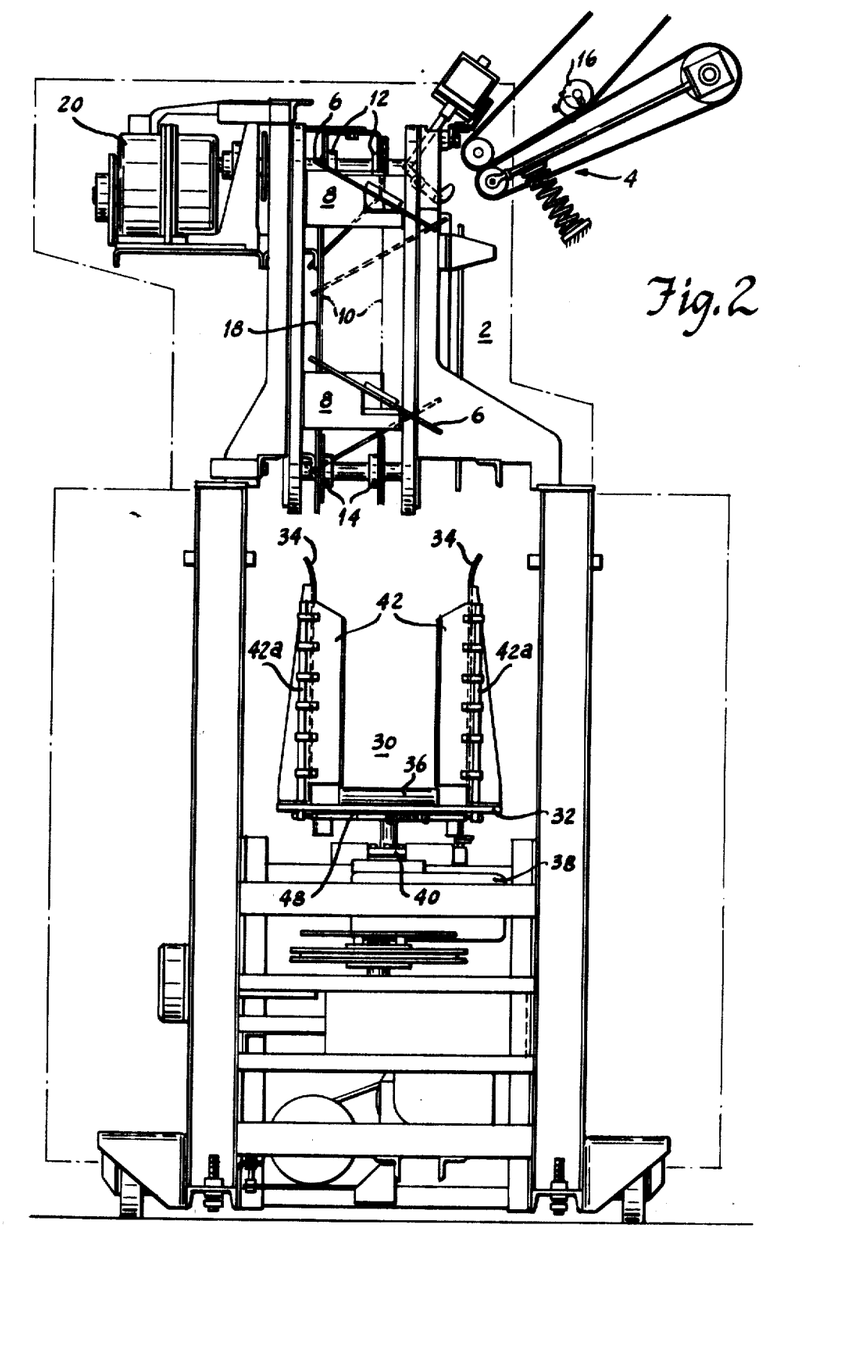
FIG. 2 is an end elevational view of the left-hand end of the counter stacker machine as viewed in FIG. 1.
Figure 5:
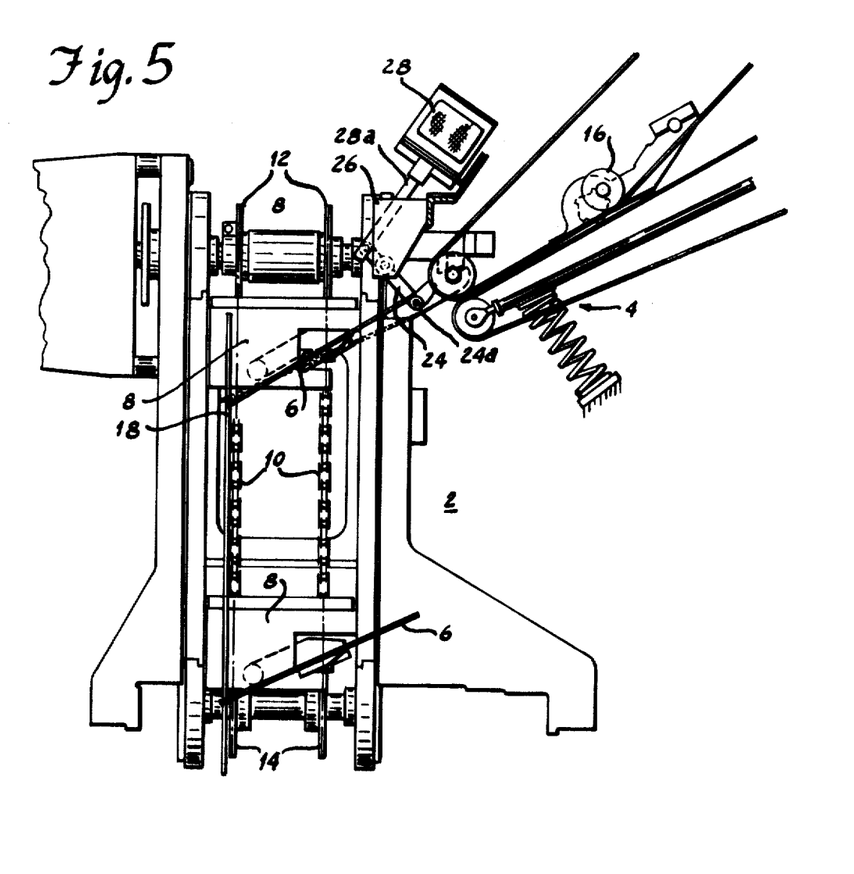
FIG. 5 is a cross sectional view of the stacking section of the counter stacker machine taken generally along the line 5–5 in FIG. 1 and drawn to a greater scale.

With reference to the drawings and particularly to FIGS. 1 and 2 the counter stacker machine may be seen to have an upper stacking section 2 for receiving the articles or newspapers from an input conveyor 4 (FIG. 2) and stacking the newspapers on aligned pairs of stacking blades 6. Blades 6 are pivotally mounted to side plates 8 (FIG. 5) which in turn are attached to the links of a pair of coextensive endless chains 10 trained around pairs of vertically aligned upper and lower sprockets 12 and 14, respectively. As may be seen in FIG. 1, stacking section 2 has two sets of the vertically extending endless chain assemblies, one right hand and one left hand in spaced transverse alignment. Each chain assembly has four stacking blade assemblies attached thereto at equal intervals and the blades 6 of each chain assembly extend toward each other along the inner reaches of the chains in aligned, cooperative relationship to provide split stacking platforms upon which the newspapers may be received.

The newspapers are delivered to the stacking section 2 by a powered input conveyor 4 which has a toothed cogwheel counter mechanism 16 mounted therein for initiating the operation of the machine upon registering predetermined numbers of newspapers. The papers exit the input conveyor and stack one upon the other on the lower pair of aligned blades 6. A pair of vertical guides 18 are mounted within the stacking section 2 to serve as rear stops against which the papers align.

The stacking section 2 is provided with a controlled acceleration and deceleration drive means 20 (FIG. 2) for indexing the stacking means in an operational cycle of the machine. While not specifically shown, the drive means 20 includes an electric motor coupled to the input of the controlled acceleration and deceleration drive device while the output thereof is connected to one of the upper shafts of section 2 on which are mounted one pair of sprockets 12. An endless chain 22 and sprocket drive (FIG. 1) is employed to transfer reverse rotational power from the directly driven upper left-hand shaft to the upper right-hand shaft of the stacking section to cause both sets of stacking blades 6 to be synchronously indexed.

A latching bar 24 is pivotally mounted between a pair of side plates 26 which are rigidly attached to the frame of the machine at the upper central portion of stacking section 2. Latching bar 24 has a pair of oppositely extending free leg portions which terminate in transversely extending cylindrical members 24a which may be integral with the bar or freely rotatable rollers attached thereto. Members 24a are normally positioned to extend within the path of travel of the tips of stacking blades 6 whereby the members 24a interfere with and restrain the free ends of a pair of blades 6 which are being indexed to the upper, or intercept position. Members 24a are set to engage the free ends of a set of blades 6 just prior to the stopping of the blades due to completion of an indexing period to pivot the blades slightly from their normal position. Although not shown in the drawings, spring means are preferably employed between stacking blades 6 and side plates 8 to bias the blades 6 to their normal position with respect to the side plates 8. A solenoid 28 is attached to the framework of the machine above latching bar 24. The solenoid has an extendable plunger 28a operatively connected to the latching bar 24 to pivot the free end of the bar out of the path of the blades 6 upon energization of the solenoid 28.

With the upper set of blades 6 restrained to the deflected position described above, the newspapers may issue in a lapped stream from the input conveyors 4 to pass just below the deflected upper set of blades 6 and fall along the guides 18 to stack upon the lower set of stacking blades 6. Upon registering a predetermined number of papers the counter means 16 initiates a cycle of the machine, energizing solenoid 28 to pivot the latch bar 24 and release the upper set of blades 6 and starting the indexing drive means 20 to index the upper set of blades 6 to the lower position and to bring a new set of blades into the upper position. When released by the latching bar 24, the upper set of blades pivot to their normal position under the bias of the associated spring means and the tips of these blades pass rapidly into and through the stream of papers to intercept the first paper of the next batch whereby it and succeeding papers stack upon these blades.

During the indexing of the stacking blades described above the blades 6 that were at the lower position are moved rapidly around the respective lower sprockets 14 to the outside reaches of the chains 10. This motion removes the support from beneath the batch of papers stacked thereon, releasing the batch for free fall deposit upon a batch receiving table 30.

Table 30 comprises a base plate 32 which has a pair of upstanding side members 34 secured thereto. The outer ends of side members 34 are flared outwardly to facilitate the deposit of the batch of papers therebetween. A narrow segment of idler roller conveyor 36 is secured to the base plate 32 to extend between the open ends of the table.

Figure 4:
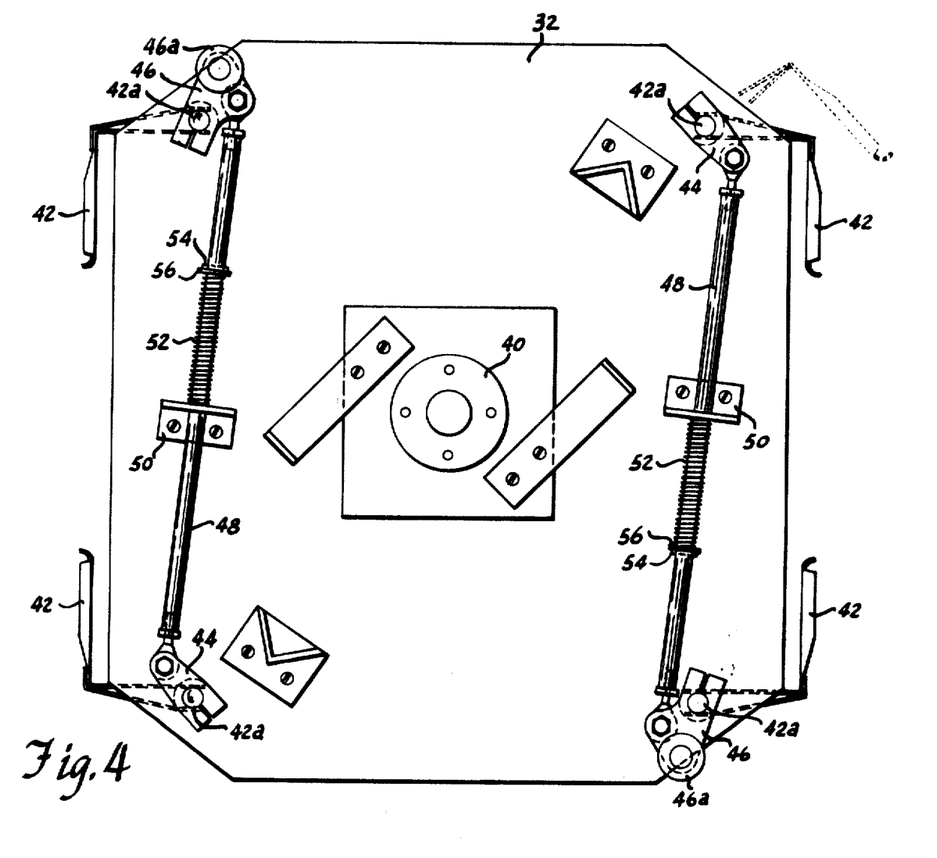
FIG. 4 is a view of the underside of the batch receiving table drawn to a greater scale and showing linkage of the batch restraining means incorporated on the table.

Table 30 is mounted on the output shaft of a controlled acceleration and velocity indexing means 38 by a mounting post and collar assembly 40 (FIGS. 2 and 4). The indexing means 38 includes an electric drive motor and clutch which are connected to the electrical control system of the machine to rotatably index the table 180° in response to a selected signal indicating the completion of an indexing movement of the stacking blades 6. If stacks comprising two batches are desired, the control system is selected to cause the table drive to respond to every other, or alternate signals from the stacking section. If three batches per stack are desired, the control system is set wherein the table drive 38 responds to two sequential signals and ignores every third signal and so on. Indexing means 38 provides a rapid, but smooth indexing motion for the table 30 to cause a minimum of disturbing forces which might tend to upset the batch of papers thereon.

In view of the high speeds with which the counter stacker machine is required to operate it has been found necessary to further restrain the batch of papers on the table 30 during the indexing period of means 38. Accordingly, cooperating pairs of gates 42 have been pivotally mounted at the open ends of the table 30 and are biased to normally be in their closed position to partially extend across the open ends of the table. Gates 42 are secured to rods 42a which are journalized for rotation at the ends of the side plates 34 and which have their lower ends projecting through the base plate 32.

Referring particularly to the bottom view of the table 30 shown in FIG. 4 the connecting linkages for the gates 42 will be described. Since the linkage for the cooperating pair of gates 42 at one end of the table is reversed but otherwise identical to the linkage for the other pair of cooperating gates at the other end of the table, only one linkage is referred to in the following description while like reference characters are applied to like parts in both linkages.

A pair of levers 44 and 46 are clamped to the projecting ends of a respective pair of rods 42a at the underside of base plate 30. A tie rod 48 is pivotally connected at its opposite ends between the free ends of the levers 44 and 46 in a reversing manner wherein rotational movement of one lever and shaft will effect movement of the other lever and shaft in the opposite rotational direction. Tie rod 48 passes through a clearance opening in the depending leg of a bracket 50 secured to the underside of base plate 32 near the longitudinal centerline of the table. A helical compression spring 52 is disposed over the tie rod 48 to extend between the depending leg of bracket 50 and a pin 54 and washer 56 carried by the tie rod to bias the gates 42 to the closed position shown in the drawings. The gates may be opened by depression of a roller 46a rotatably mounted at the free end of lever 46 which is engaged by a gate operating mechanism to be described next and moved to the dotted line position shown in the right-hand portion of FIG. 4.

The machine is provided with two gate operating mechanisms 60 mounted on the frame of the machine and positioned at diagonally opposite corners of the table (see FIG. 3) to engage the rollers 46a when the mechanisms are operated. The mechanism at the upper right-hand portion of FIG. 3 has been redrawn to an enlarged scale in FIG. 6 and will be referred to in describing the mechanism, each of the mechanisms 60 being identical.

The framework of the machine includes front and rear horizontal channel members 62 on which the mechanisms 60 are mounted. A plate 64 is secured to the top of a channel 62 by a pair of screws 66 to extend inwardly toward the table. A hex-headed shouldered pivot pin 68 is threadably fastened to the end of plate 64 to pivotally support a lever member 70. A second plate member 72 also extends inwardly from channel member 62, the latter plate member being supported by an L-shaped bracket 74 mounted to the side of channel 62 by screws 76. A hex-headed shouldered pivot pin 78 is threadably fastened to the outer end of plate 72 to pivotally support a bellcrank-type gate operating lever 80.

Lever 80 has one leg portion 80a extending outwardly of the pivot hub in a generally parallel direction to the lever 70. A tie rod 82 is pivotally connected at its opposite ends to the free ends of lever 70 and portion 80a. Another leg portion 80b of lever 80 has a pivotal connection near its free end with a plunger 84. The plunger 84 extends through a clearance opening in an upstanding leg of a bracket 86 which is secured to the plate 72. A helical compression spring 88 is disposed about the plunger 84 and seats at one end against a washer 90 fixed to the plunger. The other end of spring 88 bears against the upstanding leg of bracket 86 to provide a counterclockwise bias to lever 80 as viewed in FIG. 6. The extreme outer end of leg portion 80b is provided with a machined pad portion 80c which is disposed in cooperative alignment with a roller 46a of lever 46 on the table.

Figure 3:
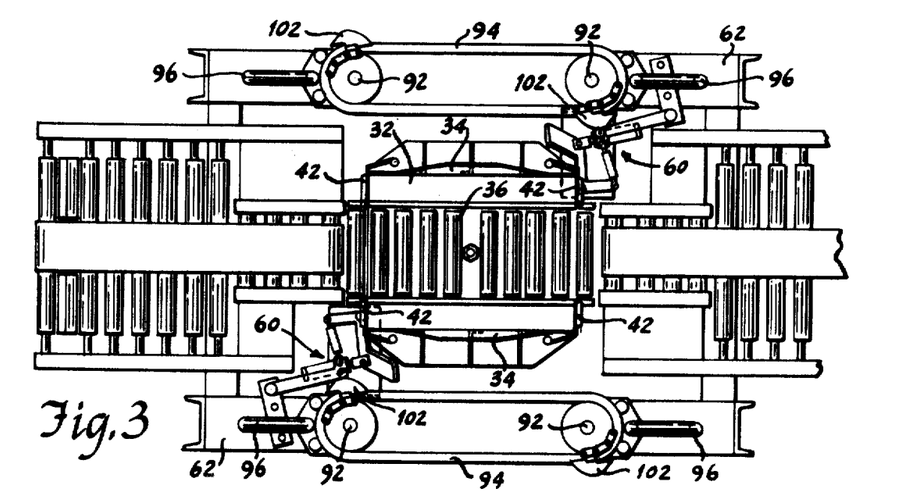
FIG. 3 is a cross sectional view of the counter stacker machine taken along the line 3–3 of FIG. 1 and showing the top view of the rotatable batch receiving table.

The stacking machine further has a pair of pusher assemblies which are operable to eject a batch or stack off the table 30. As seen in FIGS. 1 and 3, pairs of vertical shafts 92 are rotatably journaled between frame members 62 and a pair of corresponding, parallel upper frame members. Each shaft 92 has an upper and lower sprocket attached thereto and pairs of identical link chains 94 which engage and travel around corresponding upper and lower sprockets on the same side of the machine. Suitable brackets are fixed to the links of the chains 94 to mount pairs of inverted U-shaped tubular pusher bars 96 to the chain sets at diametrically opposed points as seen particularly in FIG. 3.

The pusher assemblies are provided with a controlled acceleration and velocity drive means 98, the output of which is connected to one of the shafts 92 as seen in FIG. 1. Still referring to FIG. 1, a chain 100 and sprocket arrangement similar to the chain 22 and sprocket arrangement in the stacking section 2 is employed to transfer reverse rotational power from the directly coupled shaft 92 at one side of the machine to a similar movement of the pusher members. Operation of the drive means 98 will move a corresponding pair of pusher members 96 into transverse alignment and across the length of table 30 to move a stack of papers off the table. The acceleration and velocity is controlled to prevent the pusher members from striking the stack with a sharp blow which could cause stack upsetting rebound forces. Instead, the members engage the stack under increasing acceleration and maintain engagement with the stack as the movement continues. Drive means 98 is connected to the electrical control system of the machine to respond to selected completion signals from the stacking section 2 as is the drive means 38 for table 30. However, pusher drive means 98 is set to respond to those signals which table drive means 38 does not respond to so that the table is stationary while the pushers pass thereacross to eject a stack of articles. In the situation where double batch stacks are desired, the pusher drive means 98 would respond to the opposite alternate signals from those which drive means 38 responds to. If triple batch stacks are desired, the pusher drive means 98 would respond to every third signal while the table drive means 38 responds to the sequential pairs of signals therebetween. The drive means 98 also includes a pair of motors interconnected to forward and reverse clutches for selectively reversing the movement of pusher members 96 to move stacks off the table in opposite directions.

Figure 6:
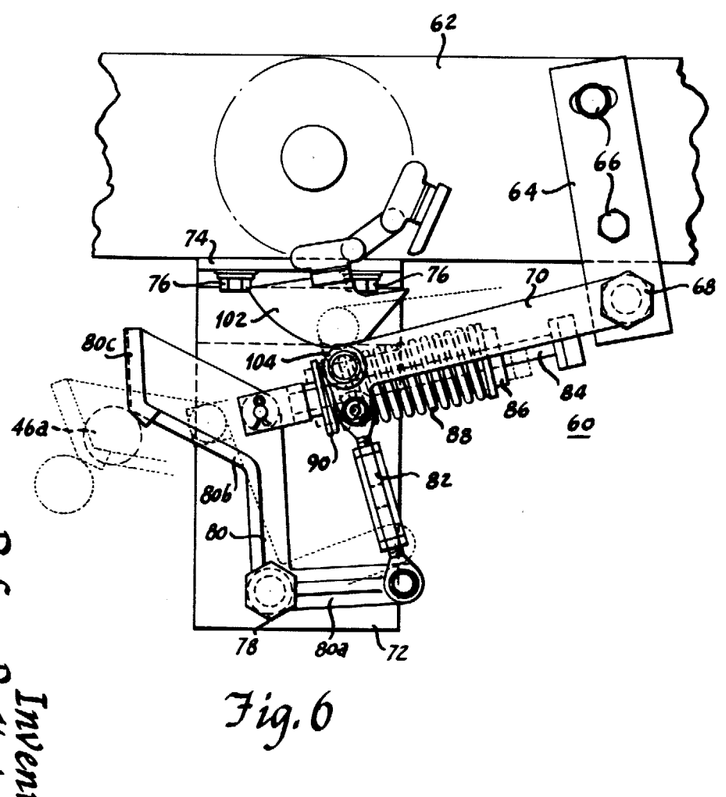
FIG. 6 is an enlarged view of an operating mechanism for the batch restraining means as shown in FIG. 3.
Figure 7:
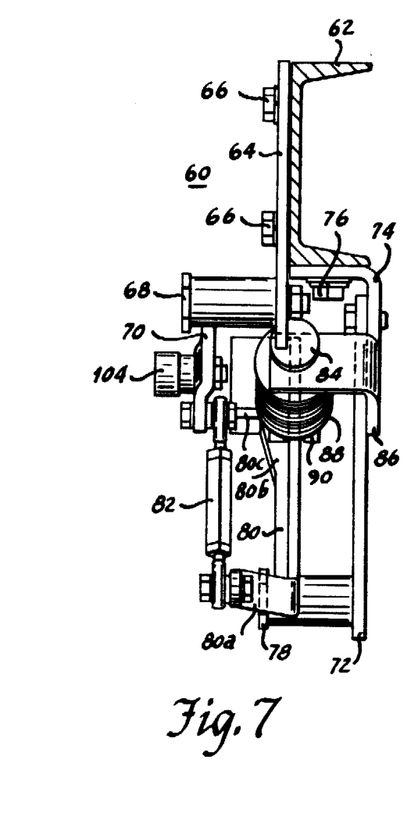
FIG. 7 is a side elevational view of the operating mechanism of FIG. 6.

Referring now to FIGS. 3, 6 and 7, the lower chain 94 of the pusher assemblies each have a pair of cams 102 fastened thereto at diametrically opposed points on the chains. The cams 102 are positioned on the chains so that at the end of an operative cycle of the pusher mechanism, one of the cams is adjacent the gate operating mechanism 60 and projecting inwardly towards the mechanism. The lever 70 of the mechanism carries an upstanding cam roller 104 to be engaged by the cam 102 when the pusher mechanism is in the at rest position. The engagement of a cam 102 with the roller 104 pivots the lever 70 inwardly of the machine which in turn causes the lever 80 to be pivoted in a direction to depress the plunger 84 against the bias of spring 88.

In the position described above, the pads 80c of levers 80 are positioned adjacent the respective rollers 46a of lever 46 on table 30. When the pusher assemblies are operated, the initial movement of the chains 94 move the cams 102 out of engagement with the respective rollers 104 to release the mechanisms 60, thereby allowing the plungers 84 thereof to extend under the bias of their springs 88. The extension of the respective plungers 84 pivot the levers 80 to cause the pads 80c to engage and depress the rollers 46c, thereby pivoting the levers 46 and 44 on the table 30 against the bias of springs 52 on the gate linkage. The movement of levers 44 and 46 cause the gates 42 on table 30 to be swung to their open position as indicated in dotted lines in the upper right-hand corner of FIG. 4.

It should be noted from the foregoing that the gates 42 are spring biased to their closed position by helical compression springs 52 and are opened only by depression of the rollers 46a. It should further be noted that the levers 80 for depressing the rollers 46a are spring biased to their engaging positions with the rollers 46a and are held out of engagement therewith only when the pusher members are in their at rest positions at the end of an operative cycle. Thus the gates are always closed when the table 30 is rotating or when it is stopped and the pushers are at rest. Initial movement of the pushers effects opening of the gate to prevent the gates from being stuck by the pushers and to permit the stack of papers to be ejected or removed from the table.

We claim:

1. In an apparatus for conveying, counting and stacking articles being delivered in a stream, together with a conveyor and means for counting said articles as they pass a given point in the stream, the combination comprising:
    stacking means at the output end of said conveyor, said stacking means including endless means having a plurality of stacking members secured thereto at regularly spaced intervals, and drive means responsive to a predetermined count of articles for indexing said endless means and said stacking members downwardly past the output end of said conveyor to cause articles to stack thereon in one indexed position and to discharge said stack at a subsequently indexed position;
    a table for receiving said discharged stack of articles thereon, said table including a pair of upstanding sidewall members, and drive means responsive to selected signals indicating completion of individual indexing movements of said stacking means for rotatably indexing said table a half revolution about an axis parallel to the path of discharge of said stack from said stacking means to said table;
    pusher means for moving a stack off said table, said pusher means including endless means having a pair of pusher members secured thereto at diametrically opposed points, and drive means responsive to signals indicating completion of individual indexing movements of said stacking means to move said pusher members across said table from end to end, said second mentioned signals being those signals not selected to be responded to by said drive means for said table;
    gate means pivotally mounted in cooperating pairs at the opposite open ends of said table;
    linkage means interconnecting cooperating pairs of said gates for mirror image pivotal movement between open and closed positions and biasing said gates to said closed position to substantially close off the respective open ends of said table;
    gate-operating means adjacent the opposite ends of said table, each of said operating means being spring biased to an extended position thereof to engage a respective one of said linkages, thereby causing said gates to be opened; and
    camming means on said pusher means, said camming means engaging said gate operating means to cam the latter to retracted positions thereof out of engagement with the respective ones of said linkages when said pusher means is at rest between indexing movements thereof.

2. The combination according to claim 1 wherein said camming means releases said gate operating means immediately upon the initial movement of said pusher means when beginning an indexing movement.

3. The combination according to claim 1 wherein each of said gate-operating means includes:
    a first lever pivotally supported from the framework of said apparatus at one end of said lever and having a roller member mounted on the free end of said lever to be engaged by said camming means on said pusher means;
    a second lever pivotally supported from said framework, said second lever being of the bellcrank type and having one leg thereof formed in a dogleg shape;
    a spring-biased plunger carried by said framework and pivotally connected to said dogleg of said second lever at the knee portion thereof, and
    a rigid link member pivotally connected between the free ends of said first lever and of the other leg of said second lever; and
    wherein engagement of said camming means with said roller member on said first lever pivots that lever which in turn drives said second lever by means of the link connection between said levers to pivot said second lever in a direction wherein said dogleg portion moves said plunger against the bias of its spring.

4. In an apparatus for conveying, counting, and stacking articles being delivered in a stream, together with a conveyor and means for counting said articles as they pass a given point in the stream, the combination comprising:
    stacking means at the output end of said conveyor, said stacking means including endless means having a plurality of stacking members resiliently secured thereto at regularly spaced intervals to permit limited movement of said stacking members relative to said endless means, latching means positioned above said conveyor and interferring with the stacking members thereat to restrain said members to a displaced position relative to said endless means, and means including drive means responsive to a predetermined count of articles for releasing said latching means and indexing said endless means and said stacking members downwardly past the output end of said conveyor to cause articles to stack thereon in one indexed position and to discharge the stack of articles at a subsequently indexed position;
    a table for receiving said discharged stack of articles thereon, said table including a pair of upstanding sidewall members, and drive means responsive to selected signals indicating completion of individual indexing movements of said stacking means for rotatably indexing said table a half revolution about an axis parallel to the path of discharge of said stack from said stacking means to said table;
    pusher means for moving a stack off said table, said pusher means including endless means having a pair of pusher members secured thereto at diametrically opposed points, and drive means to move said pusher members across said table from end to end, said second mentioned signals being those signals not selected to be responded to by said drive means for said table;

gate means pivotally mounted in cooperating pairs at the opposite open ends of said table;

linkage means interconnecting cooperating pairs of said gates for mirror image pivotal movement between open and closed positions and biasing said gates to said closed positions to substantially close off the respective open ends of said table;

gate-operating means adjacent the opposite ends of said table, each of said operating means being spring biased to an extended position thereof to engage a respective one of said linkages, thereby causing said gates to be opened; and camming means on said pusher means, said camming means engaging said gate operating means to cam the latter to retracted positions thereof out of engagement with the respective ones of said linkages when said pusher means is at rest between indexing movements thereof.

PO-1050
(5/69)

UNITED STATES PATENT OFFICE
CERTIFICATE OF CORRECTION

Patent No. 3,599,807     Dated August 17, 1971

Inventor(s) ROBERT R. HEDRICK & ROBERT W. WISCHER

It is certified that error appears in the above-identified patent and that said Letters Patent are hereby corrected as shown below:

Column 5, line 3, "chain" should be --chains--.

Column 6, line 75, after "means" insert --responsive to signals indicating completion of individual indexing movements of said stacking means--.

Signed and sealed this 4th day of April 1972.

(SEAL)
Attest:

EDWARD M. FLETCHER, JR.      ROBERT GOTTSCHALK
Attesting Officer             Commissioner of Patents